US007122973B1

(12) United States Patent
Ivers

(10) Patent No.: US 7,122,973 B1
(45) Date of Patent: Oct. 17, 2006

(54) LIGHT-GENERATING APPARATUS CONTROL SYSTEM

(76) Inventor: Kevin Thomas Ivers, 3417 NW. Bridge Rd., Woodland, WA (US) 98674

( * ) Notice: Subject to any disclaimer, the term of this patent is extended or adjusted under 35 U.S.C. 154(b) by 139 days.

(21) Appl. No.: 10/746,610

(22) Filed: Dec. 23, 2003

Related U.S. Application Data

(60) Provisional application No. 60/436,431, filed on Dec. 23, 2002.

(51) Int. Cl.
  *H05B 37/00* (2006.01)
(52) U.S. Cl. .................... 315/291; 315/86; 315/200 A
(58) Field of Classification Search ................ 315/291, 315/224, 225, 219, 209 R, 200 A, 362, 307, 315/308, 136, 129, 170, 86, 240, 241 P, 241 S
  See application file for complete search history.

(56) References Cited

U.S. PATENT DOCUMENTS

| 4,499,525 A | 2/1985 | Mallory | 362/157 |
| 5,498,934 A | 3/1996 | Nilssen | 315/224 |
| 5,821,697 A | 10/1998 | Weber | 315/200 A |
| 6,040,660 A * | 3/2000 | Schmidt et al. | 315/200 A |
| 6,160,355 A | 12/2000 | Yee | 315/200 A |
| 6,246,184 B1 | 6/2001 | Salerno | 315/291 |
| 6,249,089 B1 | 6/2001 | Bruwer | 315/200 A |
| 6,316,880 B1 | 11/2001 | Broadhurst | 315/200 A |
| 6,621,225 B1 * | 9/2003 | Bruwer | 315/86 |
| 6,808,287 B1 * | 10/2004 | Lebens et al. | 362/184 |
| 6,888,319 B1 * | 5/2005 | Inochkin et al. | 315/291 |
| 6,924,605 B1 * | 8/2005 | Chun | 315/241 P |

FOREIGN PATENT DOCUMENTS

DE   196 27 607 A1   1/1998

OTHER PUBLICATIONS

"Energizer: Energizer Quick Switch Flashlight: Product Fact Sheet," at least as early as Aug. 12, 2005, 1 page, Energizer Canada, Canada.
"Energizer Quick Switch Flashlight," Gizmodo, Sep. 15, 2004, 2 pages, www.gizmodo.com/archives/energizer-quick-switch-flashlight.

* cited by examiner

*Primary Examiner*—Wilson Lee
(74) *Attorney, Agent, or Firm*—Law Office of Karen Dana Oster, LLC

(57) ABSTRACT

A control system for a light-generating apparatus can include a control cyclically operating a switching element in series with the circuit including the apparatus's power source and light. Upon actuation of the apparatus's switch within a specified switching interval, the control shifts to a drift mode causing the circuit to automatically pass through consecutive excitation states such that the light passes through successive levels of preferably increasing intensity at a rate independent of the switching interval over an adjustment interval of momentarily indefinite duration. Another switch actuation shifts to set mode, which stops the light at a desired intensity. The drift and set operations are repeatable. An indicator preferably enables the operator to adjust the light's intensity based on the available remaining life of the power source as differently determined for each different intensity. To facilitate interchangeability between differently sized apparatus, the control's housing can include an adjustable spacing element.

23 Claims, 9 Drawing Sheets

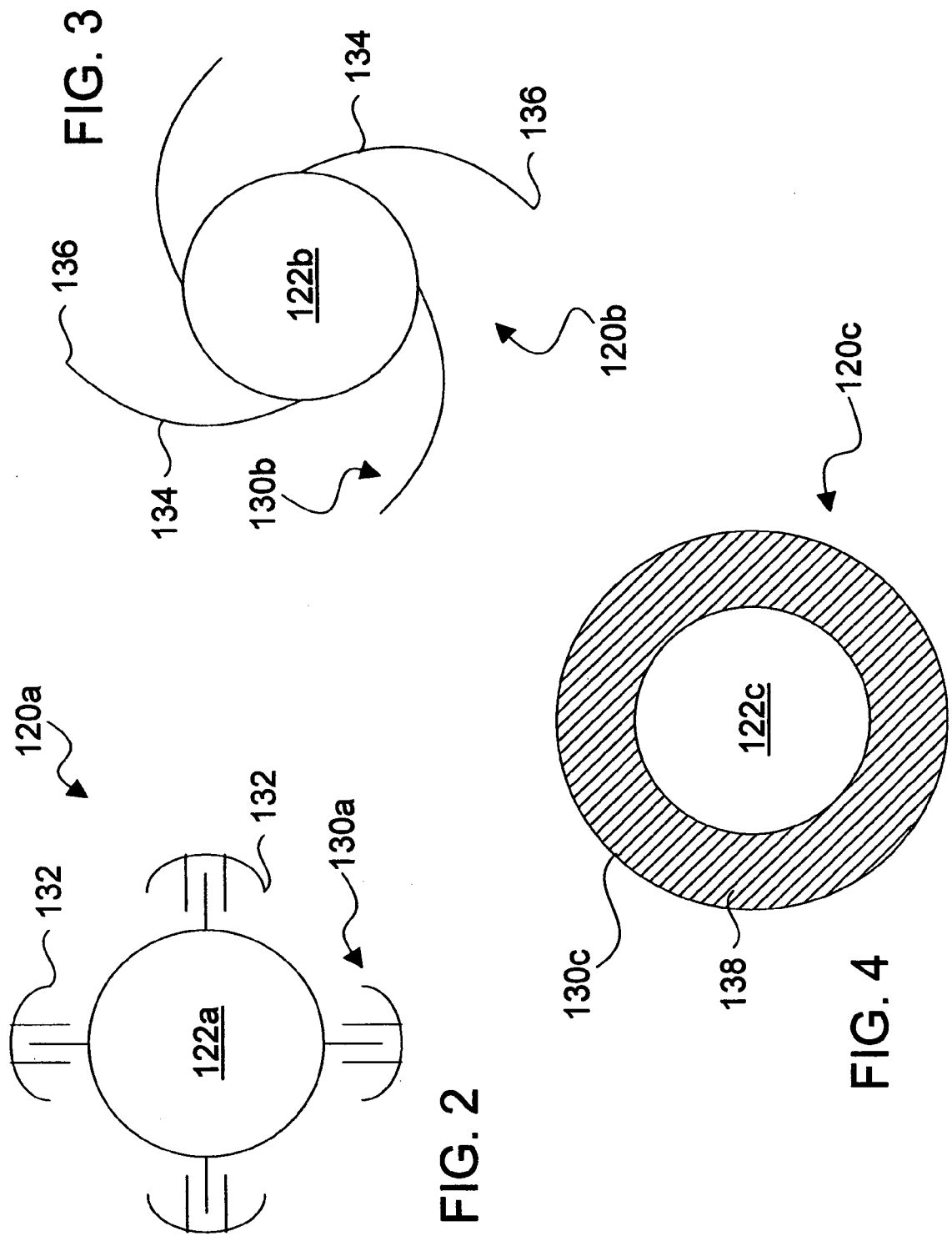

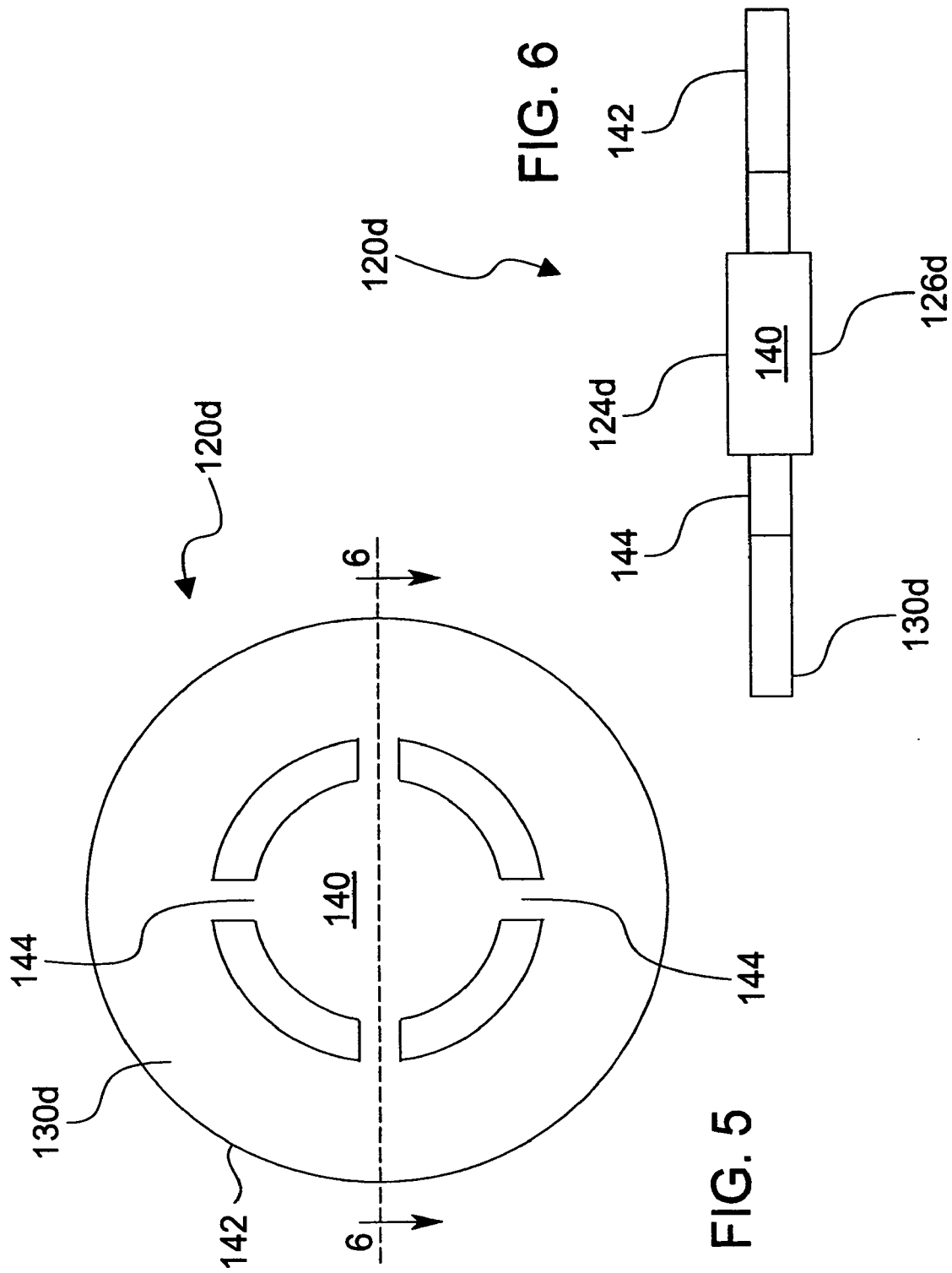

LIGHT-GENERATING APPARATUS CONTROL SYSTEM

The present application is an application claiming the benefit under 35 U.S.C. Section 119(e) of U.S. Provisional Patent Application Ser. No. 60/436,431, filed Dec. 23, 2002. The present application is based on and claims priority from this application, the disclosure of which is hereby expressly incorporated herein by reference.

BACKGROUND OF INVENTION

The present invention relates to a system for controlling a light-generating apparatus. The light-generating apparatus envisioned includes a circuit having a power source and a light. For example, the apparatus may constitute an ordinary flashlight, the light may be the flashlight's bulb, and the power source may be one or more batteries removably inserted into the battery compartment of the flashlight.

A problem typically encountered with light-generating apparatus is that shortly after replenishment of the power source, the performance of the power source starts to degrade, and the intensity of the light quickly begins to dim to unacceptable levels. In the case of the ordinary incandescent flashlight bulb, for example, as described in Weber, U.S. Pat. No. 5,821,697 (the "Weber reference"), an objectionable "yellow" light begins to appear with merely a 10–20% decrease in battery voltage. Indeed, as Weber further points out, only a 7% drop in battery voltage causes the bulb to lose 20% of its light output. Broadhurst, U.S. Pat. No. 6,316,880 (the "Broadhurst reference"), suggests that this steep performance decline is an inherent characteristic of the tungsten filament used in incandescent bulbs, which act as a black body radiator producing light proportional to the fourth power of the filament temperature.

The filler gas used in the bulb also affects performance. As described, for example, in Salerno, U.S. Pat. No. 6,246,184 (the "Salerno reference"), a typical xenon-filled flashlight bulb loses 50% of its intensity with only a 20% drop in input voltage. The problem is even more severe with "Krypton" gas-filled bulbs that, as Weber points out, drain the battery relatively more rapidly. Aggravating this problem further is the performance of the typical dry-cell battery under load. As Weber describes, such a battery exhibits three pronounced performance regions: the first during the initial portion of operation where its internal impedance increases rapidly; the second during the middle portion where the internal impedance tends to level off; and the third during the final portion where the impedance again increases rapidly to the point where the battery has no further practical value. Accordingly, designers and operators have faced a trade-off between diminished lighting ability, with attendant frustration and risks, and premature replacement or replenishment of the batteries, with attendant inconvenience, inefficiency, and costs.

To address the foregoing problem, various mechanisms for stabilizing the lamp's intensity have been proposed. One frequently cited design is shown in Mallory, U.S. Pat. No. 4,499,525 (the "Mallory reference"). In the Mallory reference, a lamp of lower voltage rating replaces the lamp originally installed, and a switching element is inserted in the circuit between the power source and the light to enable pulsed operation of the circuit. As the battery voltage declines, this decline is detected through a feedback circuit, and the width of the pulses are increased so as to increase the duty cycle of the pulse train and automatically compensate for the declining voltage.

A related design is shown in Nilssen (FIG. 5), U.S. Pat. No. 5,498,934 (the "Nilssen reference"), where an integrated circuit (IC) performs the switching function and the duty cycle is varied from 100% (with the IC switched out of the circuit) to 50% as based on feedback provided from direct sensing of the light's intensity through a photodetector. A contrasting design is shown in the Weber reference in which, in order to reduce purported circuit inefficiencies and tolerance sensitivities, the switching element is replaced by an active element that continuously adjusts the current level in the circuit in noncyclical or linear fashion. In one variant described in The Weber reference, for example, the current flow is continuously adjusted through a MOSFET in response to changes in voltage detected across the lamp. The common theme in each of these approaches is self-regulation of the lamp's intensity by means of active feedback.

As disclosed in Schmidt et al., U.S. Pat. No. 6,040,660 (the "Schmidt reference"), control devices of the above type have been conveniently packaged in disk-like or flattened form with their external contact points arranged on opposite sides. This enables an existing flashlight or lantern to be retrofitted with the device by simply opening the battery compartment and inserting the device behind the batteries. The device can also be made to be inserted above the batteries in a position proximate the lamp in the manner suggested by the Salerno reference. Still another approach has been to embed the device in a battery of conventional size as suggested in Bruwer, U.S. Pat. No. 6,621,225 (the "Bruwer '225 reference").

After the light-generating apparatus has been initially switched on, some prior mechanisms provide for a dimming function. Here the intensity of the light is backed off or decreased from its fully lit level in order to provide for variable lighting and to conserve battery and lamp life. Typically, such dimming is controlled by a manual switch, that is, either the switch can be toggled from its normal position to a dimmed position, as indicated by Yee, U.S. Pat. No. 6,160,355 (the "Yee reference"), or the switch is of variable type providing a continuous range of dimming, that is, each different position of the switch corresponds to a unique dimming level, as shown in the Nilssen reference. The variable switch, from a circuit standpoint, represents a variable resistor, and this switch can either be integrated with the primary power switch, as Nilssen shows, or separately provided, as shown in the Broadhurst reference.

Yet another approach to implementing the dimming function is described in the Schmidt reference and the Bruwer '225 reference. Under this approach, after the circuit is initially switched to its fully on position, the primary switch is briefly actuated in accordance with a predefined sequence, such as being switched off and back on again within a predetermined "switch-over" time, to indicate a dimming operation is desired. The dimming interval is set to correspond either to the switch-over interval, that is normally extremely brief because of the need to maintain power to the lamp, or a predetermined time interval following the switch-over interval, in which case the dimming operation proceeds in stages, that is to say, in stepwise fashion. In the Schmidt reference, for example, the first switch actuation signaling dimming reduces the light intensity by 50%, whereas the second such actuation reduces the intensity by another 50% (to one-quarter of the original intensity). Under this approach, it will be noted that discrete switch actions result in discrete dimming operations. Although this approach does not require special modification of the switch, as is frequently the case with a variable switch, "fine-tuning" of the lamp's intensity in the manner offered by the variable switch is not provided.

Another function found in some prior mechanisms is an indicator that signals a weakened condition of the batteries. In the Weber reference and the Yee reference, for example, when the battery voltage reaches some fixed percentage of the rated voltage so as to establish the batteries are near exhaustion, either an indicator LED turns on or a supplemental battery is switched into the primary circuit.

In the Bruwer '225 reference, a "good" battery condition is indicated by an LED briefly flashing every 10 seconds or other interval. As Bruwer explains, this also assists the user in more easily finding the flashlight in the dark. Consistent with this, Bruwer describes how an internal energy storage element, such as a capacitor, can be charged by the battery during the off portion of each switch cycle, so that the switch control has a source of reserve power to continue switching operations even when the battery's available power is primarily being directed to the lamp. This type of intermittent flashing may be contrasted with a more regular flashing routine where, for example, the flashlight is flashed on and off every half second or so. Bruwer also discloses this other type of flashing routine for signaling distress or emergency, as do several others of the references above cited.

BRIEF SUMMARY OF THE INVENTION

The present invention relates to a system for controlling the operation of a light-generating apparatus. The invention is designed to address drawbacks present in control devices of conventional design, such as described in the section above, and to provide enhanced flexibility of operation for the user.

In accordance with a preferred first aspect of the present invention, a control device is provided for controlling the operation of a light-generating apparatus including a circuit powered by a power source and including a light. In particular, the device includes an electronic switching element, configured to alternately allow and prevent current flow through the circuit, and a control element. The control element is adapted to operate the switching element so that the light is selectively switchable to an OFF state and a fully ON state. The control element further includes a drift mode and a set mode. The control element in the drift mode is configured to cyclically operate the switching element so that the circuit automatically passes through a consecutive series of excitation states such that the light passes through successive levels of intensity. The control element in the set mode is configured to cyclically operate the switching element so that the circuit is selectively set at a desired one of the states corresponding to a desired one of the intensity levels.

In accordance with a preferred second aspect of the present invention, a control device is provided for controlling the operation of a light-generating apparatus that includes a user-actuated switch and a circuit, where such circuit is powered by a power source and includes a light. Specifically, the control device comprises an electronic switching element and a control element adapted to operate the switching element such that the switching element opens and closes the circuit. In accordance with a first actuation of the switch as performed within a specified switching interval, the control element repeatedly triggers the switching element so that the circuit passes through a consecutive series of excitation states such that the light passes through successive levels of intensity at a rate independent of the switching interval. In accordance with a second actuation of the switch, the control element repeatedly triggers the switching element so that the circuit is selectively set at a desired one of the states corresponding to a desired one of the levels.

In accordance with a preferred third aspect of the present invention, a control device is provided for controlling the operation of a light-generating apparatus that includes a user-actuated switch and a circuit, where such circuit is powered by a power source and includes a light. Specifically, the control device comprises an electronic switching element and a control element adapted to operate the switching element such that the switching element opens and closes the circuit. In accordance with a first actuation of the switch, the control element repeatedly triggers the switching element so that the circuit passes through a series of excitation states such that the light passes through successive levels of intensity over an adjustment interval of momentarily indefinite duration. Upon a second actuation of the switch, the control element repeatedly triggers the switching element so that the adjustment interval is fixed and the circuit is selectively set at a desired one of the states corresponding to a desired one of the levels.

In accordance with a preferred fourth aspect of the present invention, a control device is provided for controlling the operation of a light-generating apparatus including a circuit powered by a power source and including a light. In particular, the control device includes an electronic switching element in series with the circuit and a control element adapted to toggle the switching element so that the circuit is selectively switchable between a minimal energy state and a maximum energy state. The control element further has a drift mode configured to repeatedly toggle the switching element so that the circuit automatically passes through excitation states intermediate between the minimal and maximum energy states such that the light is perceived as passing through successive levels of increasing intensity. The control element also has a set mode configured to repeatedly toggle the switching element so that the circuit is selectively set at a desired one of the excitation states corresponding to a desired one of the levels.

In accordance with a preferred fifth aspect of the present invention, a control device is provided for controlling the operation of a light-generating apparatus including a circuit powered by a power source and including a light. The device includes a control element and an indicator. The control element is adapted to control the circuit so that the circuit passes through a series of excitation states such that the light passes through successive levels of intensity. The indicator is configured to indicate the condition of the power source by generating a signal so that as the light is adjusted between selected ones of the levels, the signal is correspondingly varied to indicate the remaining life of the power source as determined based on the selected ones of the levels.

In accordance with a preferred sixth aspect of the present invention, a control device is provided for controlling the operation of a light-generating apparatus including a circuit where the circuit includes a light and is powered by at least one battery inserted in a battery compartment of the apparatus. The device includes an electrically active element and a housing containing the element. The housing is removably insertable into the compartment and includes a pair of conductive contacts coupled electrically to the active element and arranged so that if the housing is inserted into the compartment and the compartment is closed, the contacts are automatically engaged electrically with the circuit. The housing further includes an adjustable spacing element to maintain the inserted housing both in electrical engagement with the circuit and in close-fitting engagement with the compartment even if such at least one battery and compartment are varied in size.

In accordance with a preferred seventh aspect of the present invention, a method is provided for operating a light-generating apparatus being powered by a power source and including a light subject to a control. The method includes causing the light to turn on with a minimal level of intensity by actuating the control, automatically causing the light to increase past the minimal level through successive levels of increasing intensity also in response to actuating the control, and causing the light to stop at a desired one of the successive levels of increasing intensity by actuating the control again.

In accordance with a preferred eighth aspect of the present invention, a method is provided of operating a switchable light-generating apparatus having an OFF and ON state and being powered by at least one battery. Specifically, the method comprises switching the apparatus to a first state intermediate between the OFF and ON states, generating a first signal indicating the extent of remaining life in such at least one battery, and switching the apparatus to a second state intermediate between the first state and the ON state in accordance with the remaining life.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a schematic plan view of a first alternative embodiment of a control device including an automatically adjustable spacing element.

FIG. 3 is a schematic plan view of a second alternative embodiment of a control device including an automatically adjustable spacing element.

FIG. 4 is a schematic plan view of a third alternative embodiment of a control device including an automatically adjustable spacing element.

FIG. 5 is a plan view of a fourth alternative embodiment of a control device including an adjustable spacing element.

FIG. 6 is a sectional side view, taken along line 6—6 in FIG. 5.

DETAILED DESCRIPTION OF THE INVENTION

Figure 1:
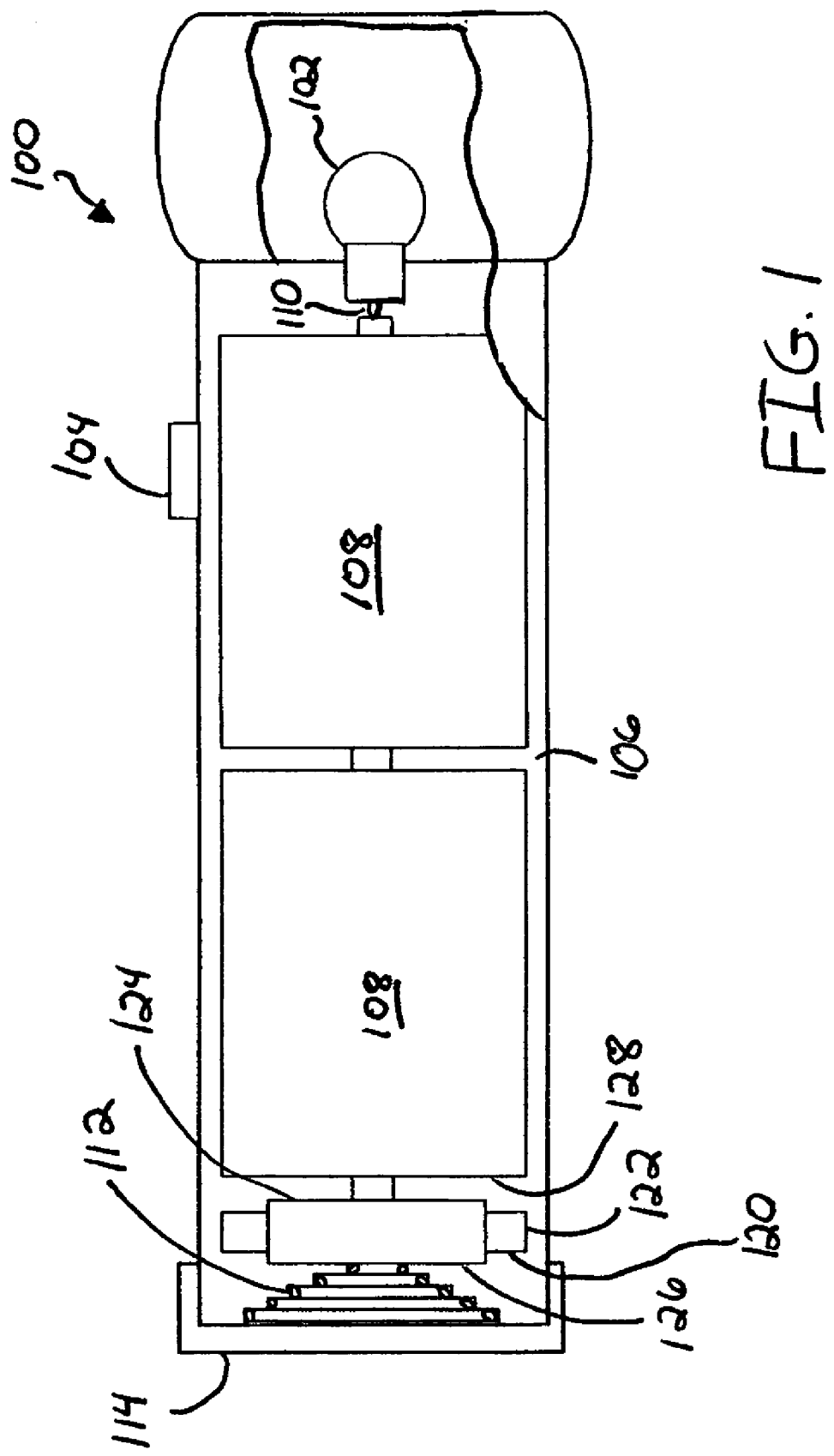
FIG. 1 is a side view of one preferred embodiment of a control device in accordance with the present invention as installed within an ordinary flashlight shown in partial cutaway view.

The present invention relates to a device and method for controlling a light-generating apparatus. In one preferred embodiment of the invention shown in FIG. 1, for example, the light-generating apparatus 100 is an ordinary flashlight. The flashlight includes a light or lamp 102, such as a xenon-filled bulb, and a switch 104 that can be manually actuated by the user. Here the switch is actuatable (shown as slidable) between an OFF and an ON position. Although the switch is shown as slidable, some other form of switch, such a depressible push-button, key-type, or multiple-position switch, could be provided. The flashlight shown includes a battery compartment 106 for holding a removable pair of dry-cell batteries (e.g., AAA, AA, C, or D sized) that act as the power source 108 for the flashlight. These batteries are normally biased against the contact point 110 of the lamp by a coiled spring 112 that defines a lower contact point and is fitted to a screw-off base 114. Absent the invention, when the switch is in the OFF or ON position, the batteries, switch, and lamp form an open or closed circuit, respectively, so that the bulb is either OFF or full ON.

One objective of the present invention is to provide a means of upgrading an existing light-generating apparatus by the simple addition of a small electronic circuit in series with the lamp, switch, and batteries. Accordingly, in the preferred embodiment depicted in FIG. 1, the control device 120 may be conveniently packaged within a thin or flattened housing 122 having a generally disk-like circular shape of the same diameter as the batteries 108, which is, corresponding to the inner circumference of the battery compartment 106 for snug or close-fitting insertion therein. Specifically, by removing the screw-off base 114, inserting the device behind the batteries 108, and replacing the screw-off base, the control device may be easily installed for upgrading an ordinary flashlight 100. The opposite sides of the housing define a pair of contact points 124 and 126 so that the inserted device automatically engages electrically the opposing contact points defined by the coiled spring 112 and lower battery terminal 128. Thus, referring also to FIG. 7, the control device, upon installation, may be automatically coupled electrically in series with the circuit defined by the power source 108, switch 104, and light 102. Alternatively, the control device can be flipped over and inserted between the top battery and the contact point 110 of the bulb 102.

For the exemplary embodiment depicted, it has been described how the physical shape of the control device 120 contributes to its universal adaptability, that is, the device can be purchased separately and later installed to retrofit an existing flashlight. Hence the control device may be sold as an upgrade kit or, if desired, may be sold as a separate element along with new flashlights. It may also come preinstalled in new flashlights so that such flashlights have the desired features of the present invention without the need for the flashlight owner to perform the upgrading process. Likewise, the control device 120 can be incorporated into a light-generating apparatus 100 of a form other than an ordinary flashlight. By way of illustration, though not of limitation, this may include a spotlight, penlight, safety light, portable light, helmet-mounted light (as used by workmen, miners, and rescuers), examining light, glasses-mounted light (as used by doctors, dentists, and watchmakers), lantern, lamps, light-emitting diodes (LED's), or any other light sources. The shape of the control device can be modified accordingly. For example, where the light-generating apparatus is a lantern, the housing of the control device can define a tablet-like shape.

In the respective exemplary alternative embodiments of the control device 120a–c depicted in FIGS. 2–4, further mechanical features contribute to the universal adaptability of the device. In each of the alternative embodiments shown, the housing 122a, b, or c of the device includes an automatically adjustable spacing element 130a, b, or c that enables the device to be inserted conformably into differently sized battery compartments, such as a "C" size or a "D" size battery compartment. In FIG. 2, the spacing element 130a comprises a set of mechanical fittings or nub-like portions 132 that are biased to project outwardly perpendicularly from the housing sides. In FIG. 3, the spacing element 130b comprises leaf-spring portions 134 mounted in cantilevered, substantially equidistant arrangement about the housing sides and having outwardly biased ends 136 that open and collapse in arc-like fashion so as to collectively simulate the centered action of a camera shutter. In FIG. 4, the spacing element 130c comprises a deformable ring 138, such as of soft and flexible or elastic material (e.g. rubber or foam), attached to the housing sides in surrounding relationship thereto. In one preferred embodiment the ring can be squeezed and released in order to conform to the circumference of the desired battery compartment. In an alternative preferred embodiment, the ring can be bent, rolled, folded, or crinkled, and then released in order to conform to the circumference of the desired battery compartment.

In the control device 120d of FIGS. 5–6, yet another embodiment of a spacing element 130d is depicted. In this embodiment, the circular center portion 140 of the housing defines contact points 124d and 126d, whereas the ring-like outer portion 142 of the same housing defines a stiff spacing element that may be rigidly connected to the center portion by radially extending, frangible strips 144 (which may be separated by cut-out portions, punch-outable tabs, or empty spacing). If the control element will be used in a larger-diameter battery compartment, such as designed to hold "D" size batteries, the spacing element formed by the outer portion and strips is kept intact. Conversely, if the control element will be used in a smaller-diameter battery compartment, such as designed to hold "C" sized batteries, the outer portion and strips are twisted and pulled until the strips break off from the center portion, whereupon the center portion is conformably sized to fit snugly inside the smaller compartment. It will be noted that in contrast to the adjustable spacing elements 130a–c respectively shown in FIGS. 2–4, the spacing element 130d shown in FIGS. 5–6 does not rely on biasing to provide the adjustment function.

It should be noted that the present invention may be implemented with a non-universally sized device in which the housing has a size and shape concurrent to the battery and battery compartment with which it is to be used. It should also be noted that for alternative power sources having a non-circular cross-section (e.g. a rectangular cross section of a 9V battery or a substantially square cross section of a 6V lantern battery), the mechanical structure could be modified or, in some cases, be used with the embodiments shown. For example, the embodiment shown in FIG. 2 could easily be used with a non-circular power sources and/or the embodiment of FIG. 4 could be modified to have an alternative cross-section suitable for use with non-circular power sources.

Figure 7:
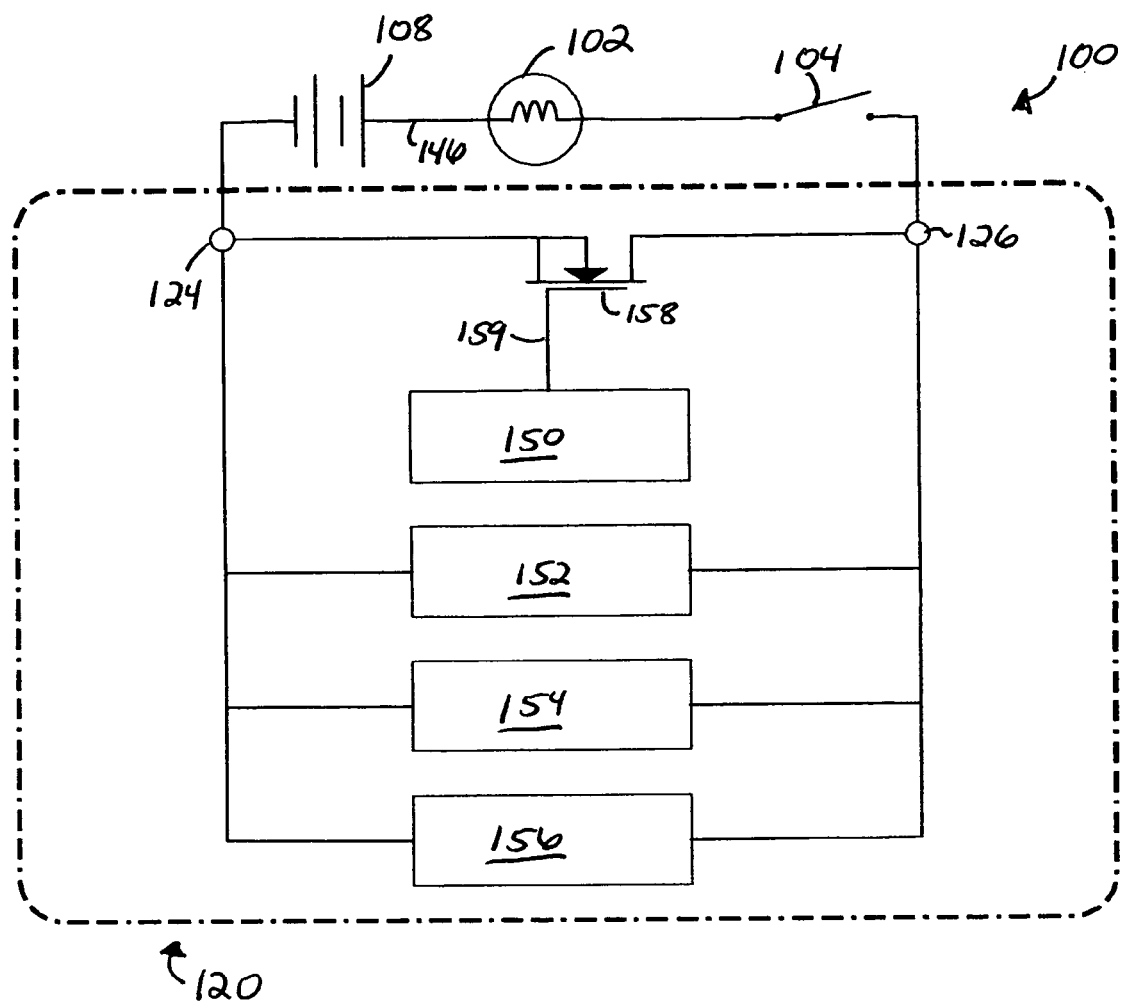
FIG. 7 is a schematic diagram of the electrical elements of the exemplary preferred embodiment of the control device and flashlight depicted in FIG. 1.

Turning attention from physical to electrical characteristics, FIG. 7 shows, in schematic or block-diagram form, how the exemplary control device 120 may be configured and electrically connected, through contact points 124 and 126, to the light-generating apparatus or flashlight 100 of FIG. 1. As previously noted, the flashlight may be of ordinary design and defines a power circuit 146 formed by the flashlight batteries 108, a light or bulb 102, and a user-actuated primary switch 104.

The exemplary control device 120 includes an intensity control element 150, a switch cycle detector 152, an internal power supply 154, a battery-level detector 156, and an electronic switching element 158. The switching element may be electrically connected serially with the flashlight's power circuit 146 so that when the user closes the primary switch 104, the bulb is powered ON or OFF depending on whether the switching element is closed or opened, respectively, by the control element 150. This construction together with the operational functionality discussed below enable the following features to be realized: 1) a relatively stable level of light intensity for the life of the batteries; 2) a means to set the operational intensity; 3) the ability to flexibly determine the battery life; 4) extended lamp life; and 5) adaptability of the control device to different sizes of flashlights. These features are discussed in greater detail below.

Figure 8:
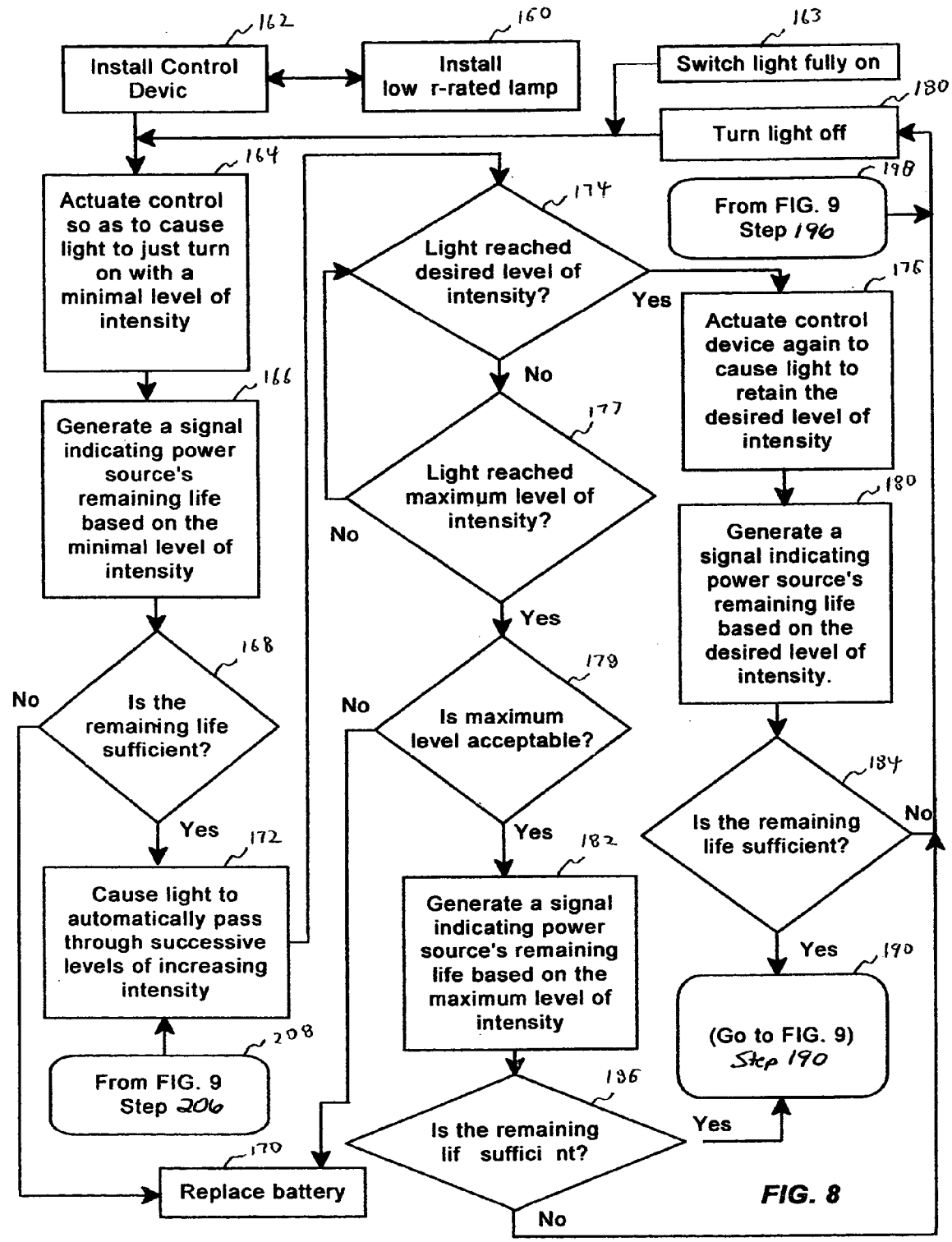
FIGS. 8 and 9 are flowcharts of a preferred sequence of operations performed in accordance with the present invention using the control device of FIGS. 1 and 7.

Referring to FIGS. 7 and 8, in accordance with an exemplary method of the present invention, the light or lamp originally provided with the flashlight is preferably replaced with a lower-rated lamp 102. For example, if the batteries 108 are two standard 1.5 volt "D" size batteries, the original lamp rated for 3.0 volts can replaced by a lamp 102 rated at 1.5 volts or even less. As indicated by a line with double arrows in FIG. 8, this substitution step 160 can be performed either before or after the step 162 of installing the control device 120. By controlling operation of the switching element 158, the control element 150 determines the energy or excitation state developed within the circuit 146 and hence determines the average voltage delivered by the batteries to the lamp. Thus, if the replacement lamp is rated at one less cell voltage than the original lamp, for example, and the flashlight has two cells or batteries, then the batteries can lose nearly half their nominal voltage, yet there will still be sufficient battery voltage for the control element to maintain the voltage across the lamp at its nominal rating.

In the preferred embodiment shown in FIG. 7, the electronic switching element 158 may be an enhancement mode MOSFET. The gate current needed to drive such a device is preferably negligible so that the control element 150 can drive the switching element in a manner that conserves the power supplied by the batteries 108.

The intensity control element 150 may be an integrated circuit having on-board logic providing the functions described in fuller detail below. Such circuits can be ordered to specification and are commercially available through semiconductor vendors. The exemplary control element shown in FIG. 7, in particular, controls the electronic switching element 158 via pulse-width modulation (PWM).

Figure 10:
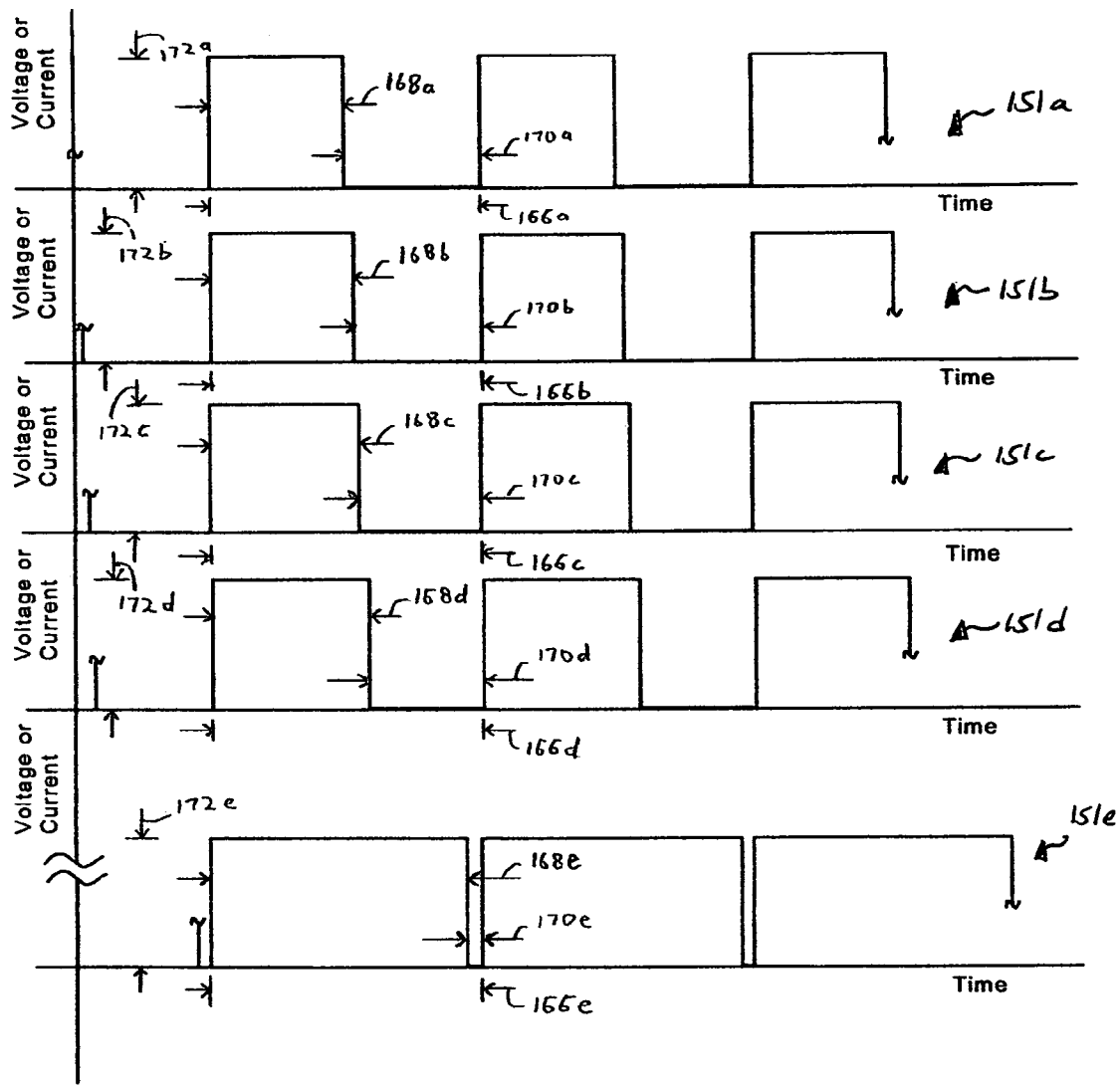
FIG. 10 is a plurality of timing diagrams showing, at successive instants in time and for a preferred "drift" mode, the gradually increasing ON period of the duty cycle of the control signal provided by an exemplary control element to an exemplary switching element that are both part of the exemplary device of FIG. 7; and likewise represent the excitation waveform of the voltage or current transferred to the bulb of the flashlight; and a control signal or excitation waveform at the instant of maximum ON period or excitation interval, respectively.

FIG. 10 represents various control signals as timing diagrams 151a–e provided by the control element 150 to the input or gate 159 of the switching element 158 and, likewise, the current or voltage transferred to the bulb 102. It is assumed, here, that the primary switch 104 is closed, that is, that the flashlight is already ON. Each control signal 151a–e constitutes a periodic series of pulses. Within each duty cycle interval 166a–e, the control signal has an ON portion or period 168a–e and an OFF portion or period 170a–e, so that the switching element is selectively switched correspondingly between an ON condition and an OFF condition, respectively. In the ON condition, the exemplary switching element or MOSFET 158 effectively acts like a short circuit in the sense that it allows or urges, with little sensitivity to voltage variation across its output terminals, current to flow through the power circuit 146 comprised by the batteries 108 and lamp 102. In the OFF condition, the exemplary switching element acts like an open circuit in the sense that it sufficiently prevents current flow through the power circuit 146 that the lamp cannot turn on. As the control element repeatedly triggers the switching element, more specifically, as it toggles the switching element through repeated ON/OFF or CLOSED/OPEN cycles, a periodically varying energy or excitation state is established in the circuit, and the current or voltage transferred to the bulb is likewise represented by FIG. 10 (as control signals 151a–e).

The visible response of the light or lamp 102 will vary depending on the particular timing or levels involved. Referring to FIG. 10, in accordance with a preferred first mode of operation of the control element 150, if the cycle interval 166a of the control signal 151a, and hence of each current or voltage cycle, is relatively long, such as a half-second or more, the light will visibly flash ON and OFF at intervals corresponding to the ON and OFF periods 168a and 170a, respectively, of the control signal. In accordance with a preferred second mode of operation of the control element, if the cycle interval 166a is sufficiently short, such as a hundredth of a second or less, because of retinal persistence in the user's eyes and thermal cool-down delay in the bulb's filament, the light will appear to hold steady or be set at a particular level of intensity. This particular intensity depends on the average voltage or current supplied to the lamp. Accordingly, the intensity will vary, in part, based on the relative proportion of the ON period or excitation interval 168a to the OFF period or relaxation interval 170a. The intensity will also vary depending on the excitation magnitude 172a of the voltage or current transferred to the lamp. In accordance, then, with a preferred third mode of operation of the control element, as the voltage provided by the batteries 108 starts to substantially decline and as the magnitude of the voltage or current transferred to the lamp likewise begins to decline in a manner causing the lamp to dim, the proportion of ON period or excitation interval to OFF period or relaxation interval is increased so as to compensate for this decline and to stabilize the intensity level.

In accordance with a preferred fourth mode of operation of the control element 150, the control element operates the switching element 158 so that the intensity level of the lamp 102 gradually slews or ramps up to its new intensity rather than making an abrupt transition. This helps prolong the lamp's life by preventing thermal shock. In particular, referring to FIG. 7, the control element cyclically operates the switching element so that the power circuit 146 that includes the lamp automatically passes through a consecutive series of increasingly energized excitation states, intermediate between the minimal or OFF and the maximum or fully ON states, such that the light is perceived as passing through successive levels of increasing intensity. The term "automatically," as used here and in the claims, is intended to signify that the indicated action, once started, occurs without further user intervention. That is, the intensity of the light is permitted to "drift" upward until the control element's mode of operation is again shifted, such as to the above-described second or "set" mode of operation, that causes the intensity to stop or be set at the selected level.

FIG. 10 shows timing diagrams 151a–d that represent successive changes in the control signal generated by the control element 150 in accordance with its fourth mode of operation. Correspondingly, these diagrams 151a–d also represent successive changes that occur in the excitation or wave pattern of the voltage or current transferred to the bulb. As noted above, the control signal generated by the exemplary control element 150 is pulse-width modulated (PWM). The respective magnitudes 172a–d and cycle intervals 166a–d of the successive control signals do not change. Rather, in the fourth mode of operation, the relative proportion of the ON period 168a, 168b, 168c, and 168d, to the corresponding OFF portion, 170a, 170b, 170c, and 170d, is gradually increased as depicted in timing diagrams 151a–d. It will be recognized that the voltage or current wave patterns transferred to the lamp will vary in like fashion. In particular, the cycle interval 166a–d of the voltage or current remains constant. Also, since there is only a relatively brief moment between successive shifts in the control signal, the excitation magnitude 172a–d does not change. This contrasts with operation in the third mode that envisions a longer period of time in which the battery voltage drops significantly due to battery depletion so that the excitation magnitude will have changed or decreased. What does change, in accordance with the fourth mode of operation, is that the relative proportion of the excitation interval 168a–d is successively increased relative to the corresponding relaxation interval 170a–d. Accordingly, with each successive shift in the control signal, the intensity level of the light, that depends on the excitation magnitude as averaged over both the excitation and relaxation intervals, gradually increases.

Comparing timing diagram 151 and timing diagram 151b, it will be noted that during operation in the fourth or "drift" mode, with each successive shift in the control signal, the ON period changes by a discrete amount, as here represented by the slight time difference between periods 168a and 168b. In accordance with a preferred embodiment of the present invention, this amount may be kept sufficiently small so that the corresponding change in the intensity level of the light 102 appears continuous to the user, that is, preferably no jumps or missing levels are discernible by the unaided eye. Accordingly, the light is perceived as smoothly passing through successive levels of intensity so as to enable fine-tuning of the intensity.

In accordance with at least some embodiments of the present invention, the control element 150 can operate the switching element 158 using a form of modulation different than that just described, such as a periodic wavetrain of set duty cycle but varying amplitude. Here the energy transferred to the bulb is still a function, for example, of the average current transferred, but in each duty cycle the maximum level of current will vary whereas normally the relative proportion of each ON period to OFF period is kept constant. Subject to nonlinearities, a periodic waveform of curved shape can also be used. In this description and in the claims, the term "cyclically operates" in reference to the switching element is merely intended to signify that the switching element operates in cycles, whether fully or partially OPEN/CLOSED or ON/OFF cycles. Conceivably, with some loss of efficiency and other functionality, the switching element could be active, in the sense of being electronically adjustable, yet not be cyclically operated. In accordance with at least certain features of the present invention, for example, the switching element could be partially ON continuously and varied in some nonperiodic manner, such as increasingly being turned ON as the voltage across the batteries declined, that is, it could operate merely as a variable resistor.

Referring to FIG. 7, the exemplary control device 120 includes a switch cycle detector 152. The general function of the switch cycle detector 152 is to actuate the control element 150 in response to a predefined sequence of manual operations detected at the primary switch 104. In other words, it enables the control element to interpret the various switching sequences or command "codes" detected at the primary switch and thus enables this switch to be used as the universal control for the device.

For example, in accordance with a preferred aspect of the invention, starting with the lamp 102 already ON at a selected intensity below its FULL ON level, if the primary switch 104 is quickly turned OFF and then back ON again within a specified switching interval, such as one second, then the switch cycle detector 152 actuates the control element 150 so as to cause this element to enter its fourth mode of operation. This, in turn, causes the level of intensity of the lamp to drift upward. If the primary switch is then, once more, turned OFF and quickly back ON again, within the specified switching interval, the detector directs the control element to shift to its second or "set" mode of operation so that the intensity is set or maintained at the level acquired at the moment of actuation. This procedure can be repeated, with the control element being switched back and forth between drift and set operations, until the maximum level of intensity is reached. It will be recognized that this flexibility in adjustment may be achieved without requiring any special or additional switches or any modification of the existing switch. From this example, it will further be recognized how the functionality provided by the second and fourth modes of operation along with the function of the detector combine to enable fine adjustment of the light's intensity using just an existing flashlight switch of ordinary ON/OFF type.

Although the switch cycle detector 152 and control element 150 are shown as separate functional blocks in FIG. 7, it will be understood that this is merely for ease of illustration and that both functions can be physically realized in a single semiconductor chip. It will also be noted that in at least some alternative embodiments of the invention, a separate switch could be provided to operate the control element. This would mean, however, foregoing the above-described benefits and diminishing the convenient adaptability of the exemplary device that allows the device, for example, to be easily retrofitted to existing flashlights.

As depicted in FIG. 7, the exemplary control device 120 includes a battery-level detector 156. The general function of the battery-level detector is to determine and to indicate the condition of the batteries 108. By the term "condition" something more is meant than a one-time determination that the batteries are about to expire. Specifically, the exemplary battery-level detector provides an on-going determination of the anticipated remaining life of the batteries. As part of this determination, the battery-level detector evaluates, at given intervals, voltages applied across the control device that indicate, for example, the falloff of the battery voltage from its original rated voltage. Also as part of this determination, the battery-level detector evaluates the corresponding current level, such as that passing through the switching element 158. This current relates to the selected intensity level, which also affects the remaining life since higher intensity levels require a higher average current from the batteries, thereby depleting the batteries more quickly. Published data is generally available, such as the graph shown in FIG. 1 of the Salerno reference, that correlate hours of battery life to falloff voltage for a given level of battery current, so that the remaining battery life can be predicted with reasonable accuracy by those of ordinary skill in the art. The information needed is stored in a manner addressable by the battery-level detector, and the detector generates a signal indicating the anticipated remaining life of the batteries. Again it will be noted that this signal varies based on the selected level of intensity of the lamp. Thus at lower intensities, longer battery life is indicated in contrast to a shorter life indicated at higher intensities.

As noted above, the exemplary battery-level detector 156 determines the anticipated remaining life of the batteries 108 at given intervals. For reasons set forth more fully below, these intervals correspond to the moment just after power-on, just after an adjustment is made to the intensity level, continuously every x interval of time while the power is on, and just before battery exhaustion. The signal generated by the detector indicating the remaining life may be presented to the user in the form of a softly pulsating light. Hence there is a fifth mode of operation of the control element 150 similar to the first or "flashing" mode, except that the control signal magnitude and corresponding light intensity is reduced and the number of pulses is limited to correspond, for example, to the number of anticipated hours remaining before battery exhaustion. Alternatively, some other visual or nonvisual indication can be provided, such as audible beeps, a flashing light sequence, or a blinking LED fitted to the outside of the flashlight, though this last involves modifying the flashlight and therefore some loss of the device's ready adaptability. Although the battery-level detector 156 is depicted in FIG. 7 as a separate element from the control element 150, this is done for ease of illustration, and the logic circuitry required to implement the battery-level detector can be physically integrated on the same semiconductor chip as the control element.

The exemplary control device 120 shown in FIG. 7 also includes an internal power supply 154. This internal supply provides power to maintain operation of the control device even when the primary switch 104 is closed and the power provided by the batteries 108 is being directed primarily to the lamp 102. This internal supply also preferably regulates the voltage provided to the control element 150 of the device so that the operation of this element is relatively independent of the battery voltage. Especially when combined with an adjustable spacing element 130 of the type described above, this feature enables the device to be used interchangeably in flashlights having different battery sizes and ratings.

When the primary switch 104 of the flashlight is closed, so that the flashlight is nominally ON, and when the switching element 158 is switched to its OFF or OPEN condition, the internal power supply 154 is recharged by the flashlight batteries 108. Referring to timing diagram 151*e*, even when the light is fully ON, there is still a small relaxation period 170*e* in which the control signal generated by the control element 150 is in its OFF period, the switching element is switched OFF, and the power from the batteries is available to recharge the internal power supply. The logic circuitry of the control element 150 is preferably designed to draw minimal current, so that the internal power supply can maintain a regulated voltage to the element even when recharged only a small percentage, nominally 1%, of the total operating time.

Figure 11:
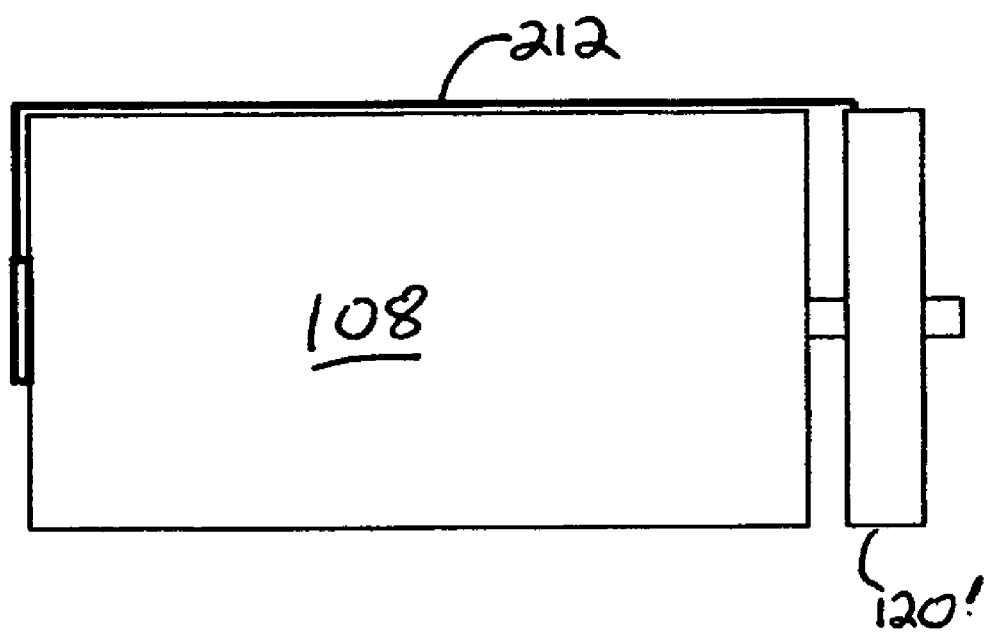
FIG. 11 is a side view of an exemplary alternative preferred embodiment of a control device attached to a battery using strapping that encloses both terminals of the battery.
Figure 12:
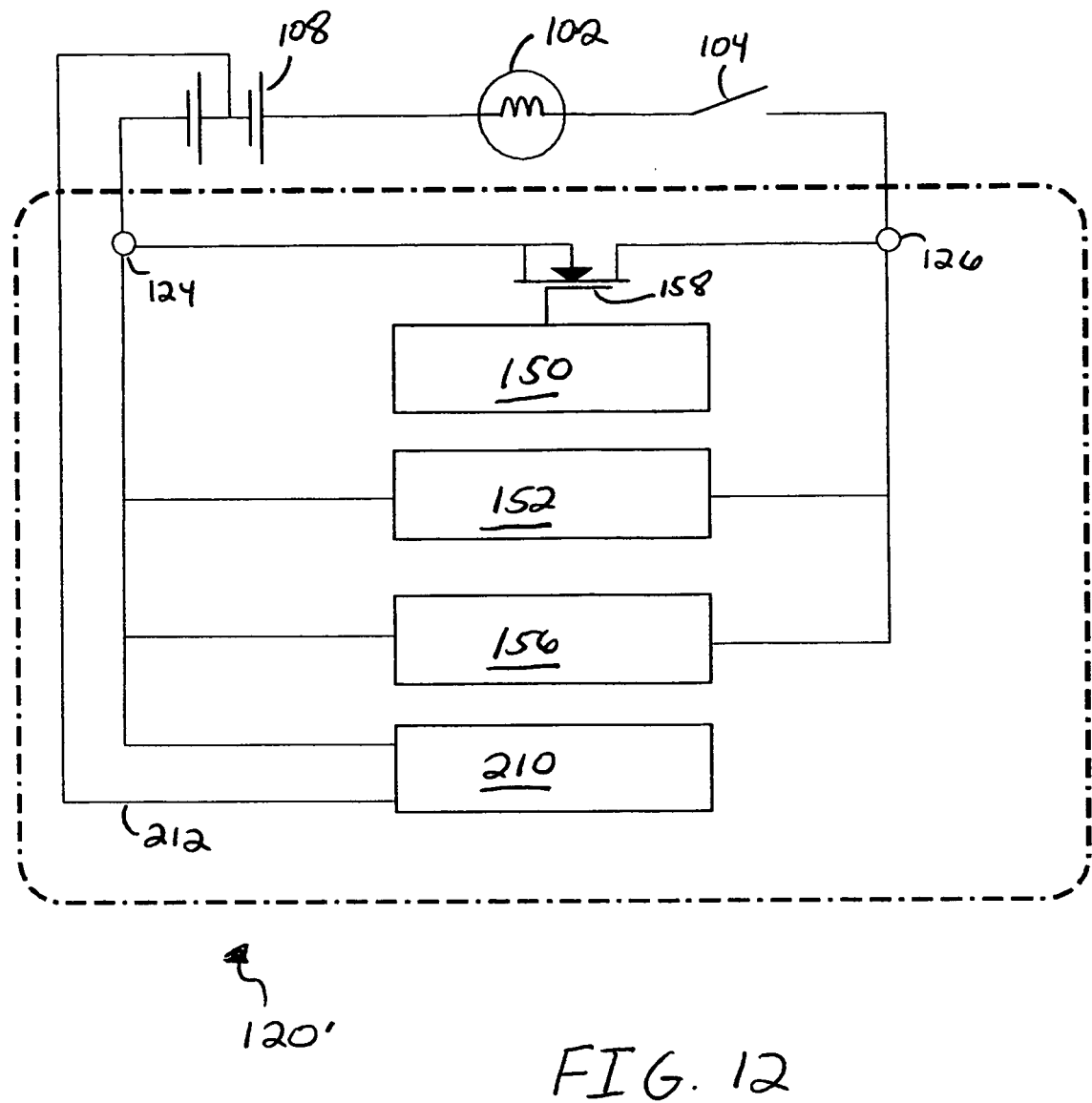
FIG. 12 is a schematic diagram of the electrical elements of the exemplary alternative preferred embodiment depicted in FIG. 11 where an external power source is used to power the control device.

Alternatively, the exemplary control device 120 shown in FIG. 7 can be constructed without the internal power supply 154. FIGS. 11 and 12 show an exemplary embodiment in which the internal power supply 154 is replaced by using one or more of the flashlight batteries 108 for power.

FIG. 11 is a side view of one of the flashlight batteries 108 in which the exemplary control device 120', without an internal power supply 154 is attached with a connection and positioning device shown as strap 212 that encloses or otherwise attaches both terminals of the battery. In this shown embodiment, the strap also serves the purpose of positioning or attaching the control device 120' to one of the flashlight batteries 108 for easy installation into the flashlight. The strap 212 also serves the purpose of electrically connecting both terminals of the attached battery to the control device, thus providing an external power source to the control device 120'. It should be noted that the strap 212 may be an alternative form of connection and positioning device such as a container (e.g. a tube with screw in ends). It should also be noted that the positioning or attaching feature is optional.

FIG. 12 is an exemplary schematic of an alternative control device 120' where the internal power supply 154 is replaced by using one or more of the flashlight batteries 108 for power. Like the embodiment of FIG. 7, the exemplary control device 120' includes an intensity control element 150, a switch cycle detector 152, a battery-level detector 156, and an electronic switching element 158. In this alternative embodiment, however, voltage regulation of the external power source may be provided by the voltage regulator 210.

The individual elements that comprise the exemplary control device 120 of FIG. 7 have now been described. The manner in which these elements are used in accordance with a preferred procedure or method of the present invention is next described in reference to FIGS. 8 and 9.

The control device 120 is first installed into the flashlight (step 160), a step that is facilitated by the adaptability of the device for being installed into flashlights of different size. The existing lamp is replaced with a lamp 102 of lower rating (step 160). If, for example, the batteries are two standard 1.5 volt "D" size batteries, the original lamp rated for 3.0 volts can replaced by a lamp rated at 1.5 volts or even less. Using a lower-rated lamp allows the lamp to be driven at reduced excitation magnitudes when the batteries are fresh and then at increasing excitation magnitudes as the battery voltage starts to decline so the light's intensity level can be maintained relatively stable despite significant battery depletion. It will be noted that the order of these first steps is not critical.

Referring to step 164, next the primary switch 104 of the flashlight is manually operated or switched to its ON position. This initial ON operation is detected by the switch cycle detector 152 that directs the control element 150 to begin cyclically operating the switching element 158 so as to cause the light to just turn ON with a minimal level of intensity. There are several advantages in having the light initially turn ON at minimal intensity as opposed to maximum. First, the voltage rating of the lamp 102 can be made substantially smaller than the battery voltage since the lamp is not presented with the full battery voltage during initial turn-on and thus not exposed to premature burnout. This, in turn, provides greater range for adjustment of the excitation magnitude and longer usable life from the batteries. Second, in situations where low light is preferred, such as where an astronomer reads a star chart or a security guard checks a potential trouble spot, starting at minimal intensity allows the operator's eyes to adjust more quickly to the surrounding darkness. Third, more operation time is spent at lower energy states thus conserving battery power.

An alternative approach is to start at full intensity and then proceed to dim the light. In contrast to this alternate approach, the preferred approach starts at minimal intensity and then ramps the intensity upward in a direction of increasing intensity subject to the ramping being checked upon a second actuation of the switch. In this context, adjusting the intensity upward rather than downward provides certain additional advantages. First, if the operator delays in operating the switch while selecting a particular intensity, it is preferable that the light be a little too bright than a little too dim. Second, if the operator initiates the intensity adjusting process and then, through inaction, inexperience or distraction, fails to complete the process, it is preferable that the default setting be full ON rather than full OFF. With the present invention, turning the lamp OFF is easily accomplished, even by an inexperienced operator, because the switch cycle detector 152 recognizes any ON to OFF sequence at the primary switch 104 that lasts longer than a predefined switching interval, here specified as 1 second, as an OFF operation.

Conceivably, it is possible to combine approaches, so that the light turns fully ON when the switch 104 is initially turned ON, and then, at the next appropriate switch sequence, the light's intensity is immediately minimized so that it can start increasing gradually upward in accordance with the normal operation of the exemplary control device 120. Such operation is indicated in FIG. 8 by steps 163 and 164, where the two steps are connected by a dashed-line to indicate the optional character of this approach. The drawback to this optional approach is that the lamp 102 and batteries 108 will likely have their lives considerably shortened.

Referring to step 166, after the switch 104 is initially turned ON and the light 102 has just come on at its minimal level of intensity, the battery-level detector 156 automatically generates a signal that indicates, based on this minimal level, the anticipated remaining life of the batteries 108. In the exemplary embodiment of FIG. 7, as described above, this causes the control element 162 to temporarily shift to its fifth mode and to softly pulse the lamp x times to indicate that x hours of remaining life are anticipated. This gives the operator an initial idea of the condition of the batteries such that the operator can predict what level of intensity might be suitably selected to best balance lamp brightness with available battery time.

Referring to steps 168 and 170, the operator may find that the anticipated remaining life is so short, even at the minimum intensity level, that it is best to immediately replace or recharge the batteries. This can occur, for example, if the batteries have drained during a long period of inactivity.

Referring to step 172, the exemplary element 150 next automatically shifts from its fifth to fourth mode so that the lamp 102 begins to gradually transition or drift through successive levels of increasing intensity. The control signal generated by the control element as it begins its fourth mode is initially as depicted as timing diagram 151a in FIG. 10. However, the control signal begins to shift so that the relative proportion of ON period 168a to OFF period 170 automatically increases gradually, as indicated by the correspondingly numbered items in timing diagrams 151b–d, so that the lamp transitions or passes through successive levels of increasing intensity. Although the initial control signal depicted as timing diagram 151a has a 50% starting ratio of ON portion 168a to total cycle interval 166a, this ratio is not critical and a lower ratio may be used provided, however, that the starting ratio is made sufficiently large to avoid flickering of the lamp at the minimal intensity level.

It will be noted that steps 164, 166, and 172 are initiated by only one operation of the switch 104, that is, the light 102 just turns ON, softly pulses to indicate remaining battery life, and begins drifting upward, all in response to manually operating the switch a single time from its initial OFF position to its ON position. If desired, these steps could be broken up by intervening switch operations so that, for example, after the light softly pulses, a second switch operation, from ON to OFF and quickly back again to ON within a brief specified switching interval, could be used, if desired, to start the drift operation.

At any time after the intensity of the light 102 begins to drift upward, if the operator decides that the intensity has reached a desired level (step 174), the operator can set or maintain that level by actuating the control device 120 a second time (step 176). For the exemplary device shown, this is done by actuating the switch 104 from the initial ON position to OFF and back again to ON within a predefined switching interval, here specified as 1 second. This particular sequence of switch operations, if received during drift mode, is interpreted by the switch cycle detector 152 and control element 150 as a set command, so the control element 150 shifts from its fourth or drift mode to its second or set mode, as described more fully above.

If the light 102 reaches the maximum level of intensity before the operator makes a selection (step 177), the intensity is maintained at this maximum level. This maximum level, in other words, is the default level. Referring to steps 170 and 178, if this maximum intensity level is insufficient, this indicates it is time to replace the batteries 108.

It will be understood here and in the claims that such terms such as "maximum level" or "fully lit," when used in describing a particular mode of the control element 150, refer to the maximum level obtainable in that mode. For example, the timing diagram 151e of FIG. 10 shows the excitation voltage of greatest average magnitude that is available in the fourth mode for driving the light 102. This excitation voltage includes a relaxation interval 170e (used for recharging the internal power supply 154) that, however, is a very small percentage of the total excitation interval 166e. Thus the maximum intensity with the device installed and operating in the fourth mode will be close to, though not quite the same, for example, as the maximum intensity or FULL ON state without the device installed.

It will be recognized that during the process of adjustment, the intensity of the light 102 is not directly determined by a single actuation of the primary switch 104 and control device 120. In accordance with the exemplary procedure described above, a first switch actuation; an ON, then briefly OFF, then back ON sequence; suffices only to begin the upward drifting and adjustment of the intensity. Once started, however, this process of adjustment does not end until there is a second switch actuation or until the intensity reaches its maximum or default level. In particular, the adjustment interval, which is here defined by the interval of time between the start and end of the upward drift in intensity, is of momentarily indefinite duration after the first actuation of the switch and control device. The operator can choose to end the adjustment process immediately, with an immediate second actuation of the switch, or instead choose a longer interval and correspondingly larger intensity change before ending the process, provided that the maximum level of intensity is not first reached.

Because the adjustment interval is independent of the switching interval, that is, the time defining a single actuation of the switch 104, the rate of intensity adjustment can be set independently of the switching interval. In the context of the present invention, this means that even with relatively brief switch intervals, the upward drift in intensity can be set at a rate that is sufficiently gradual that the operator has time to comfortably identify and select a specific intensity level. Gradually increasing the intensity, as opposed to rapid switching, also prolongs the life of the lamp 102 by reducing thermal shock. On the other hand, it is desirable to keep the switching interval relatively brief so that the operator can quickly administer commands via the switch and so that the control device can quickly distinguish between different commands, such as between a full OFF and an OFF that's part of a drift or set command.

It will be recognized that within the range of minimal to maximum intensity, the level of intensity of the light 102 is under the complete control of the operator. As the light gradually transitions or drifts, the operator can stop or set the light at whatever intensity level is desired. The exemplary procedure, in particular, allows fine-tuning of the intensity, as there are no jumps or breaks in intensity levels. If the light happens to drift past the desired level, the operator can turn the light OFF (step 180), merely by actuating the switch 104 from the ON to OFF position for longer than 1 second, and then restart the procedure with step 164. If, after actuating the switch a first time to set the intensity, the operator decides that the light falls short of the desired level, the operator can actuate the switch a second time, again by using the same predefined sequence from ON to OFF to ON within 1 second, to restart the drift mode from the last selected intensity level. The exception to this is when the last selected level is already the maximum level. In this instance, the ON to OFF to ON within 1 second sequence will shift the control element 150 to its first mode and start the bulb flashing. In this one instance, it is necessary to first turn the light OFF before the drift mode can be restarted.

Because the operator has full control of the intensity level, the operator desirably is kept apprised of the condition of the batteries 108 particularly since the normal cues indicating battery depletion (a dimming light) are not present. The battery-level detector 156, as described above, provides this function. Referring to FIG. 8, when the operator has either selected a desired level of intensity (step 176), or allowed the level to reach its default maximum value (step 178), the exemplary battery-level detector generates a signal indicating the anticipated remaining life of the batteries 180 as based on that particular level, as indicated in steps 180 and 182, respectively. In response, the exemplary control element 150 temporarily shifts to its fifth mode and causes the light to pulse x number of times indicating there are x number of hours remaining. If the remaining life is insufficient per steps 184 or 186, for example, if the operator requires three hours of life but only one hour is available at the selected intensity level, the operator can turn the light OFF (step 180), and then restart the process (step 164), so that the light will drift and can be reset at a lower intensity level that will provide the longer battery life.

On the other hand, after actuating the switch 104 so as to cause the control device 120 to set the light's intensity at a first level or state below maximum, the operator may decide, based on the number of remaining hours indicated by the pulsing light 102, that the remaining life at this first level is more than sufficient. In that case, the operator can actuate the switch twice more so as to take the light through another drift and set cycle, and thereby raise the intensity to a more desirable second level or state that still provides an acceptable remaining life.

FIG. 8 identifies the exemplary procedures associated with turning on the lamp 102 and initially setting its intensity level. Afterward, to maintain a desired level for the entire time the lamp remains on, the present invention provides the exemplary procedures shown in FIG. 9. The process of moving from the preliminary turn-on phase to the on-going maintenance phase is indicated by step 190 included in both figures.

Figure 9:
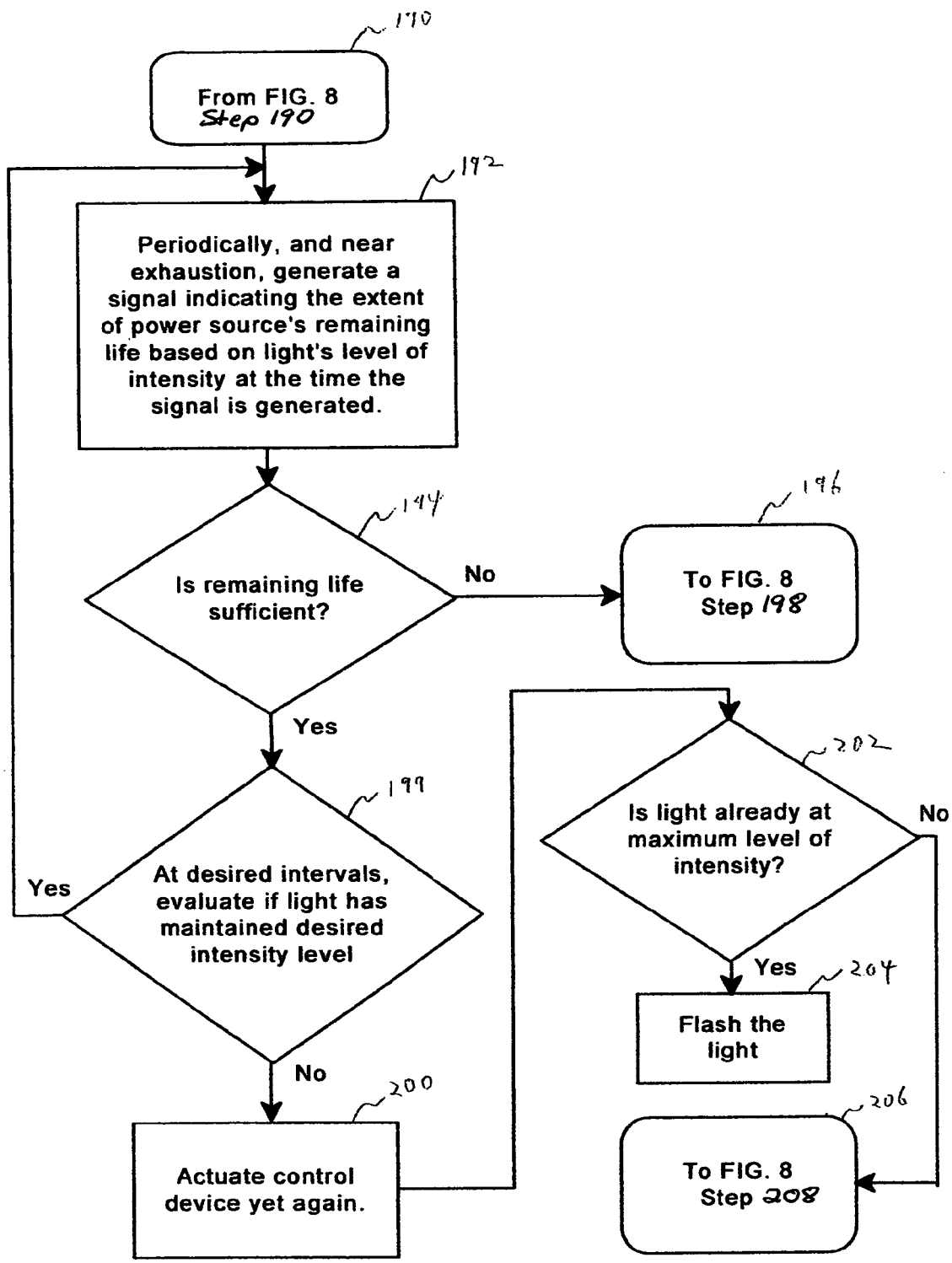

During the maintenance phase depicted in FIG. 9, both at periodic intervals and also as the condition of the batteries 108 nears exhaustion, the battery-level detector 156 generates a signal indicating the extent of remaining life in the batteries. Referring to step 192, this signal is based on the intensity level of the light 102 at the time the signal is generated. In response, the exemplary control element 150 temporarily shifts to its fifth mode and causes the light to softly pulse x times corresponding to the x hours of life remaining. The life indicated assumes that the intensity will continue to be maintained at its then existent level. Referring to step 194, the operator can then decide whether or not this remaining life is sufficient. If not, referring to steps 196 and 198 (FIG. 8), the operator can actuate the switch to send a FULL OFF command (step 180), and then restart the drift process starting at the minimal level (step 164), until a new and lower intensity can be selected that provides an acceptable remaining life.

Referring to step 199, if the remaining life of the batteries 108 is acceptable at the intensity level then existent, the operator can next evaluate whether the lamp 102 has maintained its desired intensity level. It may be noted that the enhancement mode MOSFET used as the exemplary switching element 158 will tend to drive the lamp at relatively constant current despite voltage variation across its own output terminals. Nevertheless, as the condition of the batteries substantially deteriorates with time and the source voltage significantly drops off, the magnitude of the excitation voltage at the lamp will decrease at least to some extent.

Referring to step 200, if the operator desires to restore the level, the operator can actuate the control device 120 by operating the switch 104 in accordance with a predefined "stabilizing" command, here specified as an ON-OFF-ON switching sequence of 1 second or less. If the intensity is already at its maximum level (step 202), the control element shifts to its first mode and causes the light 102 to flash (step 204). If the maximum level is not sufficient, this flashing is an indication to the operator that replacement of the batteries is warranted. If the intensity is not already at the maximum level, the control element 150 shifts to its fourth mode, steps 206 and 208 (FIG. 8). In response, the light intensity begins drifting upward (step 172) and the operator can select a higher intensity level (step 176) that more or less matches or restores, at the operator's discretion, the intensity level that existed when the batteries were still fresh. In effect, the intensity is stabilized by a feedback loop that includes the operator and over which the operator exerts immediate and full control.

Although in the procedure just described the control element 158 responds similarly in its "stabilization" and "drift" modes, if desired, a different functionality could be provided for each mode. For example, if the intensity level of the light 102 has not been adjusted for some specified period of continuous operation, such as an hour, then the usual "drift" command can be deemed a special "stabilization" command, and the control element can be operated so as to cause the level of intensity to drift upwardly, but only until the level of intensity last selected is reached. This, of course, would require providing further memory and timing functions.

It will be noted that while the particular actuation sequence assigned above to many of the commands involves an ON, OFF, ON sequence performed within 1 second, other sequences and time intervals can optionally be used.

It will also be noted that while the exemplary control device 120 is specially designed for adaptability, that is, it is designed to be easily installed in existing flashlights of ordinary design without further modification and without loss of functionality, other configurations are possible consistent with at least some embodiments of the present invention. For example, additional and conveniently labeled switches or indicator lights could be provided.

It will further be noted that although the exemplary control device 120 has been described in the context of its use with an ordinary flashlight, the construction and operation of this device could be adapted to other forms of light-generating apparatus so as to realize at least some of the advantages of the present invention in accordance with at least some embodiments thereof.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A control device for controlling the operation of a light-generating apparatus, said apparatus including a circuit powered by a power source and including a light, said control device comprising:
    (a) an electronic switching element configured to alternately allow and prevent current flow through said circuit;
    (b) a control element adapted to operate said switching element so that said light is selectively switchable to an OFF state and a fully ON state, said control element further including a drift mode and a set mode;
    (c) said control element in said drift mode being configured to cyclically operate said switching element so that said circuit automatically passes through a consecutive series of excitation states such that said light passes through successive levels of intensity; and
    (d) said control element in said set mode being configured to cyclically operate said switching element so that said circuit is selectively set at a desired one of said excitation states corresponding to a user desired one of said levels of intensity at the level of intensity at the time said set mode is user selected.

2. The control device of claim 1 wherein said apparatus includes a user-actuated switch and said control element alternates between said drift mode and said set mode in accordance with said switch being selectively actuated.

3. The control device of claim 1 wherein said apparatus includes a user-actuated switch, and said control element enters said drift mode in accordance with a first actuation of said switch and enters said set mode in accordance with a second actuation of said switch.

4. The control device of claim 3 wherein each actuation is defined by a sequence of operations on said switch and the respective sequences corresponding to said first actuation and said second actuation are the same.

5. The control device of claim 3 wherein said apparatus reenters said drift mode in accordance with a third actuation of said switch.

6. A control device for controlling the operation of a light-generating apparatus including a user-actuated switch, said apparatus including a circuit powered by a power source and including a light, said control device comprising:
    (a) an electronic switching element;
    (b) a control element adapted to operate said switching element such that said switching element opens and closes said circuit;
    (c) said control element being adapted to repeatedly trigger said switching element in accordance with a first actuation of said switch as performed within a specified switching interval so that said circuit passes through a consecutive series of excitation states such that said light passes through successive levels of intensity at a rate independent of said switching interval; and (d) said control element being adapted to repeatedly trigger said switching element in accordance with a second actuation of said switch so that said circuit is selectively set at a desired one of said excitation states corresponding to a user desired one of said levels of intensity at the level of intensity at the time said second actuation.

7. A control device for controlling the operation of a light-generating apparatus including a user-actuated switch, said apparatus including a circuit powered by a power source and including a light, said control device comprising:
(a) an electronic switching element;
(b) a control element adapted to operate said switching element such that said switching element opens and closes said circuit;
(c) said control element being adapted to repeatedly trigger said switching element in accordance with a first actuation of said switch so that said circuit passes through a series of excitation states such that said light passes through successive levels of intensity over an adjustment interval of momentarily indefinite duration; and
(d) said control element being adapted to repeatedly trigger said switching element in accordance with a second actuation of said switch so that said adjustment interval is fixed and said circuit is selectively set at a desired one of said states corresponding to a desired one of said levels.

8. A control device for controlling the operation of a light-generating apparatus, said apparatus including a circuit powered by a power source and including a light, said control device comprising:
(a) an electronic switching element in series with said circuit;
(b) a control element adapted to toggle said switching element so that said circuit is selectively switchable between a minimal excitation state and a maximum excitation state;
(c) said control element further having a drift mode configured to repeatedly toggle said switching element so that said circuit automatically passes through excitation states intermediate between said minimal and maximum excitation states such that said light is perceived as gradually passing through successive levels of increasing intensity; and
(d) said control element further having a set mode configured to repeatedly toggle said switching element so that said circuit is selectively set at a desired one of said excitation states corresponding to a desired one of said levels.

9. A method of operating a light-generating apparatus, said apparatus being powered by a power source and including a light subject to a control, said method comprising the steps of:
(a) causing said light to turn on with a minimal level of intensity by actuating said control;
(b) automatically, also in response to actuating said control, causing said light to increase past said minimal level through successive levels of increasing intensity; and
(c) causing said light to stop at a desired one of said successive levels of increasing intensity by actuating said control again.

10. The method of claim 9 further comprising the step of causing said light to increase automatically past said desired one of said successive levels by actuating said control yet again.

11. The method of claim 10 further comprising the step of causing said light to stop at a second desired one of said successive levels by actuating said control yet again.

12. The control device of claim 1 further comprising an indicator configured to indicate the condition of said power source by generating a signal so that as said light is adjusted between selected ones of said levels of intensity, said signal is correspondingly varied to indicate the remaining life of said power source as determined based on said selected ones of said levels of intensity.

13. The control device of claim 6 further comprising an indicator configured to indicate the condition of said power source by generating a signal so that as said light is adjusted between selected ones of said levels of intensity, said signal is correspondingly varied to indicate the remaining life of said power source as determined based on said selected ones of said levels of intensity.

14. The control device of claim 7 further comprising an indicator configured to indicate the condition of said power source by generating a signal so that as said light is adjusted between selected ones of said levels of intensity, said signal is correspondingly varied to indicate the remaining life of said power source as determined based on said selected ones of said levels of intensity.

15. The control device of claim 8 further comprising an indicator configured to indicate the condition of said power source by generating a signal so that as said light is adjusted between selected ones of said levels of intensity, said signal is correspondingly varied to indicate the remaining life of said power source as determined based on said selected ones of said levels of intensity.

16. The method of claim 9 further comprising a method of indicating the condition of said power source by generating a signal so that as said light is adjusted between selected ones of said levels of intensity, said signal is correspondingly varied to indicate the remaining life of said power source as determined based on said selected ones of said levels of intensity.

17. The control device of claim 1, wherein said circuit passes through said consecutive series of excitation states such that said light is perceived as smoothly passing through said successive levels of intensity.

18. The control device of claim 6, wherein said circuit passes through said consecutive series of excitation states such that said light is perceived as smoothly passing through said successive levels of intensity.

19. The control device of claim 7, wherein said circuit passes through said consecutive series of excitation states such that said light is perceived as smoothly passing through said successive levels of intensity.

20. The method of claim 9, wherein said circuit passes through said consecutive series of excitation states such that said light is perceived as smoothly passing through said successive levels of intensity.

21. The control device of claim 1, wherein said successive levels of intensity of said light gradually increase in said drift mode.

22. The control device of claim 6, wherein said successive levels of intensity of said light gradually increase in accordance with said first actuation.

23. The control device of claim 7, wherein said successive levels of intensity of said light gradually increase in accordance with said first actuation.

* * * * *